Patented Dec. 25, 1945

2,391,844

UNITED STATES PATENT OFFICE 2,391,844

PROTECTING MAGNESIUM AND ITS ALLOYS FROM FIRE

James B. Reid, New York, N. Y., assignor to The Dow Chemical Company, Midland, Mich., a corporation of Michigan No Drawing. Application February 7, 1944, Serial No. 521,435

5 Claims. (Cl. 117—137)

The invention relates to coated articles of magnesium and its alloys. It more particularly concerns a method of protecting magnesium articles from ignition by fire by liquid film-forming compositions adapted to produce coatings on magnesium and its alloys as by painting, varnishing, enamelling, and the like.

In this description and the appended claims, the term "magnesium" is used to mean either magnesium or alloys thereof in which magnesium is present in an amount constituting not less than about 75 per cent of the alloy. The term "liquid film-forming composition" is intended to include paints, varnishes, lacquers, enamels, and like compositions forming coatings.

Magnesium is now widely used in the manufacture of articles where its lightness is of prime importance as in the field of transportation, and more particularly that of aircraft. In these applications, magnesium is used in a wide variety of forms including castings, extruded shapes, forgings, and rolled sheet. In these forms, magnesium is more or less susceptible to ignition upon being heated in air to a temperature approaching the melting point of the metal. In general, the smaller the cross-sectional area of the object of magnesium the more readily it may be brought to the ignition temperature and thus set on fire when there is access of air or oxygen. Many of the magnesium parts now being used are of relatively thin section, particularly parts fabricated from, or consisting of, rolled magnesium sheet. All such articles, particularly those having a relatively small cross-section, present a problem of protection from fire when subjected to temperatures approaching the melting point of the material, not hitherto adequately solved.

I have now found that by adding to a paint, varnish, or like coating or film-forming composition, an inorganic fluoride having a melting point above that of magnesium and preferably not readily dissolved by water, coating compositions are obtained which upon application to articles of magnesium, and drying or hardening in situ, make them resistant to ignition by fire. In addition, fires once started do not as easily propagate on magnesium coated with such compositions and the compositions may be used also for their decorative and protective value. If desired, the usual decorative and protective finishes may be applied over the fire-retarding coating. The fire-retarding coating composition may be applied to the magnesium articles after conventional chemical surface treatments, such as, for example, the "chrome pickle" and "dichromate" treatments (U. S. Navy Bureau of Aeronautics designations M303 and M407, respectively) and preferably before other paints or varnishes are applied so that the fluoride ingredient is brought close to the metal surface as when the fluoride is present in the primer.

The fluorides which may be used are those having a higher melting point than magnesium and solubility of preferably less than 0.7 gram per 100 cc. of water, viz.: magnesium fluoride, chromic fluoride, calcium fluoride, lithium fluoride, manganese fluoride, lead fluoride, strontium fluoride and barium fluoride. Of these fluorides, those of the metals in the second group of the periodic system, especially calcium fluoride and magnesium fluoride, either separately or used together as in the proportions corresponding to their eutectic give good results. All these fluorides are almost insoluble in water (solubility less than 0.7 gram per 100 cc. of water) and this relative insolubility is a desirable characteristic, especially in applications exposed to the weather. The more insoluble fluorides of those listed which are especially useful in exposed applications are: calcium fluoride, magnesium fluoride, strontium fluoride, manganese fluoride, chromic fluoride, lead fluoride. In applications not subject to exposure to excessive moisture, either aluminum fluoride or beryllium fluoride may be used as the fluoride constituent of the coating composition.

In preparing a liquid-coating composition for treating articles of magnesium according to the invention, any of the usual organic-liquid coating materials may be employed which produce an organic binding film upon drying, such as those containing in solution a binder that is deposited as the solvent dries or evaporates, or those which contain drying oils. These binders or film-forming materials are present in or formed upon drying conventional paints, varnishes, lacquers, enamels, primer coatings, etc., as, for example, the linseed, tung, and like drying oil-base pigmented paints; the cellulose, artificial and natural gum and resin-containing lacquers; varnishes, such as those comprising a volatile vehicle carrying in solution a soluble film-forming or binder material; and enamels as, for example, those composed of pigmented varnishes.

In accordance with the invention, there is added to the film-forming liquid coating material, such as one of the aforementioned coating materials, at least one of the aforesaid inorganic metal fluorides in a suitably comminuted form and thoroughly incorporated in the liquid-coating material, as by stirring or preferably grinding in a ball or pebble mill, in a proportion of at least one per cent and preferably as much as from five to one hundred per cent or more by weight of the film-forming solids of the coating material, these solids including the binders, such as the gums, resins or the like, and the pigments, if any. The fluorides so employed may be ground to 200 mesh or finer, preferably to 320 mesh, although other degrees of fineness may be used. When pigments are to be added to the coating liquid, it is preferable to employ the fluoride in as fine a state as that of the pigment and to grind both the fluoride and pigment together in incorporating them into the liquid vehicle. In the absence of a pigment in the film-forming liquid vehicle, the fluoride may be proportioned to the binder in the ratio of 25 to 60 parts of fluoride per 50 parts of binder and incorporated in the vehicle by grinding in a ball or pebble mill or other suitable device.

The following examples are illustrative of the invention:

Example 1.—Prime coating

| | | Per cent by weight |
|---|---|---|
| Pigment | zinc yellow | 24.2 |
| | asbestine | 4.4 |
| | fluoride, e. g. $CaF_2$ | 4.3 |
| Vehicle | binder: alkyd resin | 26.7 |
| | solvent: xylol | 40.6 |

Example 2.—One coat finish

| | | |
|---|---|---|
| Pigment (fluoride, e. g. $CaF_2$) | | 20 |
| Vehicle | binder: phenol - formaldehyde resin | 40 |
| | solvent: toluol | 40 |

The fluoride-containing liquid coating materials prepared as described may be applied by dipping, brushing, or spraying the article of magnesium to be coated and drying as is usual with conventional paints, varnishes, lacquers, enamels and the like, as the case may be. Best results are obtained when the fluoride constituent of the coating material is in the prime coat. In general, it is preferable to so coat all the surfaces of the article that are normally exposed and subject to the risk of fire, although coating but one side of a sheet magnesium article, for example, gives valuable protection from ignition by fire.

This application is a continuation-in-part of my copending application Serial No. 281,217, filed June 26, 1939.

I claim:

1. The method of protecting an article of magnesium from ignition by fire which comprises applying over the surface of the article a film-forming organic liquid coating composition having incorporated therein a comminuted metal fluoride having a melting point above that of magnesium and adapted to protect it from ignition by fire, so as to form a coating thereon, and allowing the coating to harden.

2. The method of protecting an article of magnesium from ignition by fire which comprises applying over the surface of the article a film-forming organic liquid coating composition containing a pigment with which is incorporated a comminuted metal fluoride having a melting point above that of magnesium and a solubility in water of less than 0.7 gram per 100 cc. of water so as to form a coating thereon, and allowing the coating to harden.

3. The method of protecting an article of magnesium from ignition by fire which comprises applying over the surface of the article a film-forming organic liquid coating composition having incorporated therein calcium fluoride so as to form a coating thereon, and allowing the coating to harden.

4. The method according to claim 3 in which the metal fluoride is magnesium fluoride.

5. The method according to claim 3 in which the metal fluoride is a mixture of calcium fluoride and magnesium fluoride.

JAMES B. REID.